US007800580B2

(12) United States Patent
Johnson et al.

(10) Patent No.: US 7,800,580 B2
(45) Date of Patent: Sep. 21, 2010

(54) TRANSITION BETWEEN GRAYSCALE AND MONOCHROME ADDRESSING OF AN ELECTROPHORETIC DISPLAY

(75) Inventors: Mark Thomas Johnson, Eindhoven (NL); Guofu Zhou, Eindhoven (NL); Johannes Petrus Van De Kamer, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 771 days.

(21) Appl. No.: 10/598,204

(22) PCT Filed: Feb. 24, 2005

(86) PCT No.: PCT/IB2005/050671

§ 371 (c)(1), (2), (4) Date: Aug. 21, 2006

(87) PCT Pub. No.: WO2005/088603

PCT Pub. Date: Sep. 22, 2005

(65) Prior Publication Data

US 2007/0146306 A1 Jun. 28, 2007

(30) Foreign Application Priority Data

Mar. 1, 2004 (EP) .................................. 04100803

(51) Int. Cl.

*G09G 3/34* (2006.01)
*G09G 5/10* (2006.01)
*G02B 26/00* (2006.01)

(52) U.S. Cl. ........................ 345/107; 345/690; 359/296

(58) Field of Classification Search ................. 345/107, 345/690, 63, 72, 88, 89; 359/228, 296
See application file for complete search history.

(56) References Cited

U.S. PATENT DOCUMENTS

| | | | | |
|---|---|---|---|---|
| 3,612,758 | A | 10/1971 | Evans et al. | |
| 5,961,804 | A | 10/1999 | Jacobson et al. | |
| 6,120,839 | A | 9/2000 | Comiskey et al. | |
| 6,130,774 | A | 10/2000 | Albert et al. | |
| 2003/0137521 | A1 * | 7/2003 | Zehner et al. | 345/589 |

FOREIGN PATENT DOCUMENTS

| | | | |
|---|---|---|---|
| WO | WO9953373 | A1 | 10/1999 |
| WO | WO03044765 | A | 5/2003 |

OTHER PUBLICATIONS

EP Application No. 02077017.8—Specification.
EP Application No. 03100133.2—Specification.
EP Application No. 02079203.2—Specification.

* cited by examiner

*Primary Examiner*—Bipin Shalwala
*Assistant Examiner*—Ilana Spar

(57) ABSTRACT

An electrophoretic display that is switchable between a grayscale updating mode and a monochrome updating mode. The monochrome updating mode provides for extreme pixel states only including black and white, whereas the grayscale updating mode provides for an intermediate grayscale pixel state. A suitably selected transition signal is applied when switching from the grayscale updating mode to the monochrome updating mode. The transition signal involves a drive pulse that serves to reduce the level of remnant DC voltage otherwise occurring in each pixel due to differences in the grayscale updating mode and the monochrome updating mode.

11 Claims, 4 Drawing Sheets

TRANSITION BETWEEN GRAYSCALE AND MONOCHROME ADDRESSING OF AN ELECTROPHORETIC DISPLAY

FIELD OF THE INVENTION

The present invention relates to an electrophoretic display, and in particular to such a display that provides for transitions between a grayscale drive scheme and a monochrome drive scheme.

TECHNOLOGICAL BACKGROUND

Electrophoretic displays are known since long, for example from U.S. Pat. No. 3,612,758. The fundamental principle of electrophoretic displays is that the appearance of an electrophoretic media encapsulated in the display is controllable by means of electrical fields. To this end the electrophoretic media typically comprises electrically charged particles having a first optical appearance (e.g. black) contained in a fluid such as liquid or air having a second optical appearance (e.g. white) different from the first optical appearance. Alternatively the media might be transparent and comprise two different type of particles having different colors and opposite charge.

The display typically comprises a plurality of pixels, each pixel being separately controllable by means of electric fields supplied by electrode arrangements. The particles are thus movable by means of an electric field between visible positions, invisible positions, and possibly also intermediate semi-visible positions. Thereby the appearance of the display is controllable. The invisible positions of the particles can for example be in the depth of the liquid or behind a black mask.

A more recent design of an electrophoretic display is described by E Ink Corporation in, for example, WO99/53373. Electrophoretic medias are known per se from e.g. U.S. Pat. Nos. 5,961,804, 6,120,839, and 6,130,774, and can be obtained from, for example, E Ink Corporation.

Grayscales or intermediate optical states in electrophoretic displays are generally provided by applying voltage pulses to the electrophoretic media for specified time periods, such that the particles are moved to intermediate, semi-visible positions. The implementation of grayscales in electrophoretic displays is however connected with a number of problems. A fundamental problem is that it is very difficult to accurately control and keep track of the actual positions of the particles in the electrophoretic media, and even minor spatial deviations might result in visible grayscale disturbances.

Typically, only the extreme states are well defined (i.e. the states where all particles are attracted to one particular electrode). In case a potential is applied forcing the particles towards one of the extreme states, all the particles will be collected essentially in that particular state if the potential is applied long enough. However, in intermediate states (gray levels) there will always be a spatial spread among the particles, and their actual positions will depend upon a number of circumstances, which can be controlled only to a certain degree. Consecutive addressing of intermediate gray levels is particularly troublesome. In practice, the actual grayscale is strongly influenced by image history (i.e. the preceding image transitions), the waiting time (i.e. the time between consecutive addressing signals), ambient temperature and humidity, lateral non-homogeneity of the electrophoretic media etc.

Furthermore, accurate addressing of an electrophoretic media is obstructed by an inertia experienced in the particles. As it turns out, the particles do not respond immediately to an electrical field but instead requires a certain activation time when addressed, which results in increased image retention. To this end, the non-pre-published patent applications in accordance to applicants docket referred to as PHNL020441 and PHNL030091, which have been filed as European patent applications 02077017.8 and, 03100133.2, suggest to minimize the image retention by using preset pulses (also referred to as shaking pulses). Preferably, the shaking pulse comprises a series of AC-pulses. However, the shaking pulse may alternatively comprise a single preset pulse only.

Each shaking pulse (i.e. each preset pulse) has an energy that is sufficient to release particles present in one of the extreme positions, but insufficient to move the particles substantially. The shaking pulses thereby increase the mobility of the particles such that the subsequent drive or reset pulse has an immediate effect.

According to the co-pending European application 02079203.2 (=PHNL021000), the gray level accuracy can be further improved using a rail-stabilized approach, which means that the gray levels are always addressed via a well defined reset state, typically one of the extreme states (i.e. one of the rails). The benefit of this approach is that the extreme states are stable and well defined, as opposed to the less well defined intermediate states. The extreme states are thus used as reference states for each grayscale transition.

Theoretically the uncertainties in each gray level therefore depend only upon the actual addressing of that particular gray level, since the initial position is well known.

However, when using this approach grayscale transitions become visible as flicker, since a transition from one gray level to another includes an intermediate transition where the pixel is in one of the extreme states. This flickering effect can be reduced in case the reset state is chosen to be the particular extreme state that is closest to the previous and/or subsequent states.

For example, in a black and white display the reference initial rail state for a grayscale transition is chosen according to the desired gray level. The gray levels between white (100% bright) and middle gray (50% bright) are achieved starting from the white reference state, and gray levels between full dark (0% bright) and middle gray (50% bright) are achieved starting from the black reference state. The advantage of this method is that an accurate grayscale can be addressed with a minimum of flickering and a reduced image update time.

According to the above principle each grayscale transition thus includes a reset pulse, which resets the pixel in the respective extreme state, and an addressing pulse, which sets the pixel in the desired grayscale state. Theoretically, the duration of a reset pulse need not be longer than the time required for the particles to travel from the present state to the selected extreme state. However, using such a limited reset pulse does not actually reset the pixel completely. In fact, the appearance of the pixel still depends upon the addressing history of the pixel to some degree.

Therefore, the co-pending European application EP 03100133.2 (PHNL030091) proposes a further improvement by the use of an over-reset voltage pulse, extending the duration of the reset pulse. The reset pulse thereby consists of two portions: a "standard reset" portion and an "over-reset" portion. The "standard reset" requires a time period that is proportional to the distance between the present optical state and the extreme state. The "over-reset" is needed for erasing pixel image history and improving the image quality.

Using the reset pulse, the pixels are first brought to a well-defined extreme state before the drive pulse changes the optical state of the pixel in accordance with the image to be displayed. This improves the accuracy of the gray levels. The "over-reset" pulse and the "standard reset" pulse together have an energy which is larger than required to bring the pixel into the extreme state. Unless explicitly mentioned, for the sake of simplicity, the term reset pulse in the following refers to reset pulses without an "over-reset" pulse as well as to reset pulses including the "over-reset" pulse.

However, when the "over-reset" approach is employed the total reset period is always longer than the actual grayscale driving pulse (i.e. the pulse that moves the particles from the selected extreme state to the desired gray level), leading to the build-up of a net remnant DC voltage in the pixel. The remnant DC is actually built up and stored to some extent in the display media. The remnant DC therefore has to be timely removed or at least reduced in order to avoid gray scale drift in the subsequent image updates. In case the reset state continuously shifts between the two extreme states, the drift problem is substantially eliminated since the integral remnant DC voltage is thereby kept close to zero. However, in practice, the image sequences are often not random, and dark gray to dark gray or light gray to light gray transitions may repeatedly occur. The remnant DC is then integrated with an increased number of consecutive image transitions via the same extreme state, leading to a large grayscale drift towards that particular extreme state in subsequent image transitions. The probability of having these repetitions is particularly high if the display has a large number of gray levels.

The complete voltage waveform that has to be presented to a pixel during an image update period is referred to as the drive voltage waveform or simply the drive signal. The drive voltage waveform usually differs for different optical transitions of the pixel. The range of drive waveforms, or drive signals, that are needed for full addressing of the display is typically stored in a look-up-table taking the present state and the subsequent state as input and specifying a suitable waveform based thereon.

In order to provide smooth transitions between pixel images, short updating times are crucial. However, drive waveforms including the above-described shaking and preset pulses of course extend the updating time. A tradeoff thus has to made between image updating time and accurate image updating.

SUMMARY OF THE INVENTION

Thus, when switching between different gray levels there is typically a need for an elaborate combination of shaking and reset pulses. For the purpose of the present invention it is, however, realized that switching only between the extreme states (e.g. between the black and the white states) is much easier, since these states are well defined unlike the intermediate gray levels. In a display that need not provide grayscales (i.e. a monochrome display), the drive wave forms can therefore be made simpler and the resulting updating times are thus shorter compared to displays that provide for grayscales.

It is furthermore realized that two different modes of operation can be provided—a monochrome updating mode (MU) and a grayscale updating mode (GU) in displays that at times are used as monochrome displays, e.g. as an electronic book, and at other times are used for displaying grayscales (e.g. pictures). For comparison, updating in the monochrome mode might require an updating time of about 300 ms whereas updating in a four level grayscale mode might require about 900 ms. Thereby the tradeoff between grayscale accuracy and updating time can be differently tuned in a single display depending on whether or not grayscales are actually needed.

Hence, one aspect of the present invention provides an electrophoretic display comprising a drive unit, a drive circuitry, and at least one pixel cell that is arranged with drive electrodes and that contains an electrophoretic media that is responsive to an electric field applied between said drive electrodes. The drive unit is arranged to provide said pixel cell with a drive signal via said drive circuitry and is switchable between a monochrome drive scheme and a grayscale drive scheme. The monochrome drive scheme involves drive signals that provides for only two extreme optical pixel states, and the grayscale drive scheme involves drive signals that provides for at least one additional, intermediate pixel state between said extreme states. In other words, the monochrome drive scheme typically involves short, low complexity drive signals that provide for only two distinct extreme states but that facilitates rapid updating of the display. The grayscale drive scheme on the other hand typically involves extended, high complexity drive signals that provide for additional, intermediate color states between said limit color states but that also increases the updating times and thus reduces the overall performance of the display.

The drive unit is furthermore operative to apply a separate transition drive signal when switching from said grayscale drive scheme to said monochrome drive scheme, whereby said transition drive signal is arranged so as to counteract the build-up of remnant DC voltage in the pixel cell.

One way of interpreting this aspect of the invention is thus that a grayscale drive scheme is employed for accurately accessing the extreme states as well as a number of (or at least one) gray levels, a monochrome drive scheme is employed in case only the extreme states are of interest, and that a transition signal is employed when switching from the gray scale updating mode to the monochrome updating mode. Addressing from one extreme state to the other extreme state is obviously possible by means of either of the drive schemes, but is more rapidly provided for by the monochrome drive scheme.

A display featuring both grayscale and monochrome updating modes typically operates satisfactory in both the grayscale mode and the monochrome mode. However, it is realized that there might be problems concerning the switching from the grayscale mode to the monochrome mode. In particular, the switching typically results in a substantial build up of remnant DC voltages resulting in incorrect gray levels and image retention effects as discussed above. The build-up of remnant DC voltage is particularly problematic when frequently switching between the two drive schemes since the remnant DC is then integrated over time. For example, switching from black to white in the monochrome updating mode may take 300 ms whereas switching back to black in the grayscale updating mode might take 800 ms. Each such cycle thus gives a surplus of 500 ms drive voltage which is integrated in the display cell. Therefore, the drive unit according to the invention is operative to apply a separate transition drive signal when switching from the grayscale drive scheme to the monochrome drive scheme. The transition drive signal is selected so as to counteract the build-up of remnant DC in the pixel cell, which otherwise occurs when switching from the grayscale updating scheme to the monochrome updating scheme.

The transition drive signal can be implemented in many different ways. The common denominator is that special measures, that are not prescribed by the monochrome updating scheme as such, are taken when switching from the grayscale updating mode to the monochrome updating mode. One alternative way of interpreting this aspect is that the monochrome updating scheme is always initiated by a drive sequence that is not part of the scheme during continuous monochrome driving.

For example, according to one embodiment the transition drive signal drives the pixel repeatedly between the two extreme states so as to remove any remnant DC in the pixel cell before the monochrome drive scheme is initiated. Thereby any remnant drive history residing in the cell is effectively removed. However, straightforward implementation of this embodiment might result in visible image disturbances since the display is actually driven between the two extreme states causing a visible flicker in the display.

It is further realized that the remnant DC appearing in a pixel cell when switching from the grayscale updating mode to the monochrome updating mode is most notable in case the last image displayed in the grayscale mode was close to one extreme state and the first image displayed by the monochrome mode is the opposite extreme state (e.g. a transition from light gray or even white in the grayscale mode to black in the monochrome mode). This is due to the fact that the grayscale mode generally builds up a higher remnant voltage in the cell, which is acceptable during grayscale mode operation since the subsequent drive signal then typically adds on a correspondingly high remnant voltage with opposite polarity whereby the integral remnant DC is kept at an acceptable level. Therefore, according to one embodiment, the transition drive signal involves a drive signal corresponding to a signal in the grayscale drive scheme. In effect, this means that the grayscale updating mode is deliberately continued for one additional addressing cycle after having initiated the monochrome updating mode.

Still one alternative way of reducing the integral remnant voltage when switching from the grayscale updating mode to the monochrome updating mode is to employ an additional voltage pulse whose sole purpose is to reduce the integral remnant voltage. Thus, according to one embodiment the transition drive signal involves a short, low complexity drive signal corresponding to a signal in the monochrome drive scheme but modified with an additional remnant DC reducing voltage pulse.

According to one embodiment, the additional, remnant DC reducing voltage pulse is employed before said short, low complexity drive signal.

The electrophoretic display typically comprises a number of pixel cells which might be arranged in a matrix configuration as described above. The pixels are then preferably addressed in a consecutive manner. Such addressing can be performed according to an active addressing mode employing for example a thin film transistor (TFT) arrangement, or it can be performed according to a passive addressing scheme. Regardless of the scheme chosen, the addressing time for each pixel is typically restricted to a predefined time-span. According to some schemes, parts of the drive pulse for each pixel is actually common for all pixels. For example, in case shake pulses are employed these might be applied to all pixels at the same time. This circumstance facilitates more rapid updating but also makes it difficult to use different updating schemes for different pixels, and thus necessitates the use of standardized waveforms. Under these conditions, the present invention is particularly useful, since the grayscale drive scheme can be used in case any gray levels are requested for any one pixel whereas the more rapid monochrome drive scheme is employed in case only the extreme states are requested for all the pixels. This thus results in very rapid updating of monochrome images as well as in highly accurate updating of images involving grayscales. According to one embodiment, the display thus comprises a number of pixel cells that are addressable in image frames, and the grayscale drive scheme is employed for image frames that include at least one intermediate pixel state and the monochrome drive scheme is employed for image frames that include extreme states only. For some applications, it is advantageous to divide the display area into sub-frames, each sub-frame displaying a different type of information. For example, a square portion of the display area might show a picture whereas the rest of the display shows a black and white text. Alternatively, the display might be used as user-interface for a multiple-window computer program whereby the display is naturally divided in a number of sub-windows. In case monochrome information is displayed in one sub-window and information requiring grayscales is displayed in another sub-window, different drive schemes might of course be applied to the various sub-windows.

The drive signals might be derived in a computer unit, taking a more or less extensive drive history in consideration when deriving a suitable drive signal for a given situation. In case the present invention is applied to such a display the computer unit might have two different algorithms, one for the monochrome drive scheme and one for the grayscale drive scheme. However, this is a quite complicated solution resulting in expensive devices. According to one embodiment the drive schemes are therefore defined in a look-up-table. To this end the display further comprises a memory unit in which pre-defined drive signals corresponding to the respective drive schemes are stored accessible by the drive unit. Actually, the advantages of the present invention are even more evident using look-up-tables, since the selected drive scheme comprises binary information well suited for such tables. According to one embodiment, the memory unit is arranged with two look-up-table, one for each drive scheme. Alternatively the two drive schemes might be included in one single look-up-table.

Another aspect of the present invention provides a method for driving an electrophoretic display. The method according to the present invention comprises the steps of:

receiving image information regarding an image to be displayed;

selecting a drive scheme from a monochrome updating drive scheme and a grayscale updating drive scheme, depending on the existence of grayscales in the image to be displayed;

employing a transition signal in case the drive scheme is changed from the grayscale drive scheme to the monochrome drive scheme, said transition signal being such that any remnant DC voltage is reduced;

employing a drive signal that is based on the selected drive scheme and that corresponds to said image to be displayed.

BRIEF DESCRIPTION OF THE DRAWINGS

The present invention will now be further described with reference to the accompanying, non-restictive but examplifying drawings on which.

DETAILED DESCRIPTION OF THE INVENTION

Figure 1:
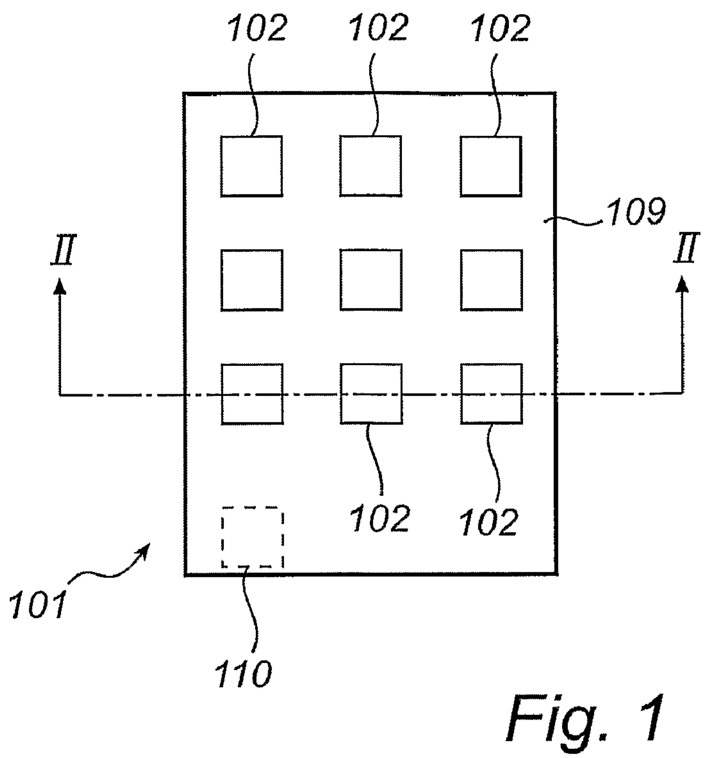
FIG. 1 is a schematic top view of an electrophoretic display unit.
Figure 2:
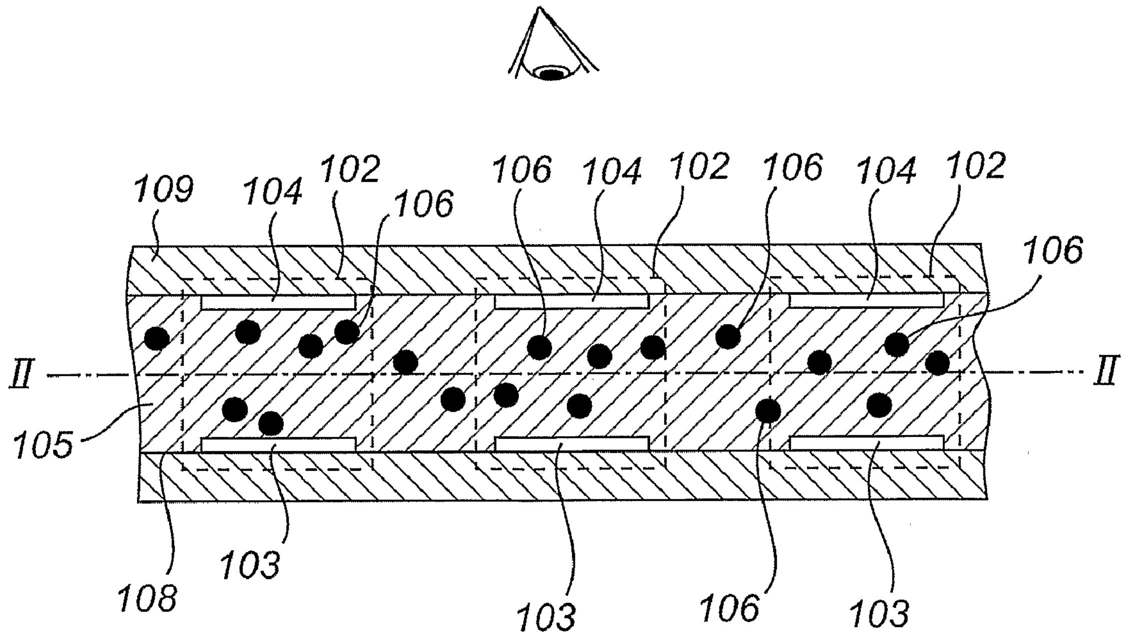
FIG. 2 is a schematic cross section of the display unit of FIG. 1.

First, the fundamental principles of electrophoretic displays will be further described with reference to FIGS. 1 and 2. Thus, FIGS. 1 and 2 show a top view and a cross section, respectively, of an electrophoretic display panel 101 comprising a backside substrate 108, a front side substrate 109, and a plurality of pixels 102. The pixels 102 are arranged along substantially straight lines in a two-dimensional configuration. However, other arrangements of the pixels are of course possible. The device further comprises a drive means 110 for driving the display.

The back and front side substrates 108, 109 are arranged parallel to each other and encapsulate an electrophoretic media 105. The substrates can for example be glass plates, and it is important for at least the front side substrate 109 to be transparent in order to display a visible image. Each pixel is defined by the overlapping areas of line electrodes and row electrodes 103, 104 arranged along respective substrates. For example, the line electrodes 104 might be arranged on the front side substrate 109 and the row electrodes 103 are in such case arranged along the backside substrate 109. Alternative arrangements using individual thin film transistors (TFT's) providing for active addressing of the display is obviously feasible as well. The electrodes are preferably formed out of ITO (Indium Tim Oxide), but other electrode materials are also possible. In the configuration shown in FIGS. 1 and 2, it is however important for the electrodes arranged on the front side substrate to be transparent, not to interfere with the displayed image of the pixel.

The electrophoretic medium 105 provides each pixel 102 with an appearance, being one of a first and a second extreme appearances (states) and intermediate appearances (states) between the first and the second appearances. Depending on the color composition of the electrophoretic medium, the first extreme appearance might for example be black and the second appearance might be white. In such case the intermediate appearances are various degrees on a grayscale. However, the extreme appearances might alternatively be different, preferably opposing colors (e.g. blue and yellow, the intermediate appearance then being various different colors). For the purpose of the present invention, and for the sake of simplicity, such intermediate colors are also referred to as grayscales.

Figure 3:
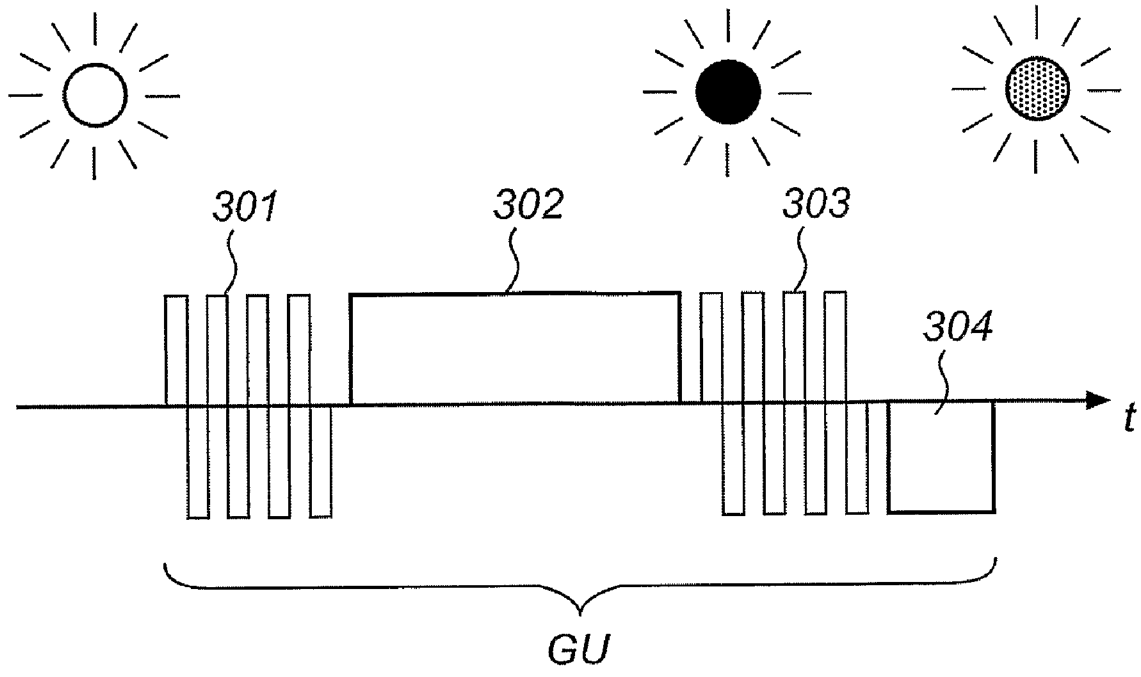
FIG. 3 illustrates typical drive signal waveforms for a grayscale drive scheme.
Figure 4:
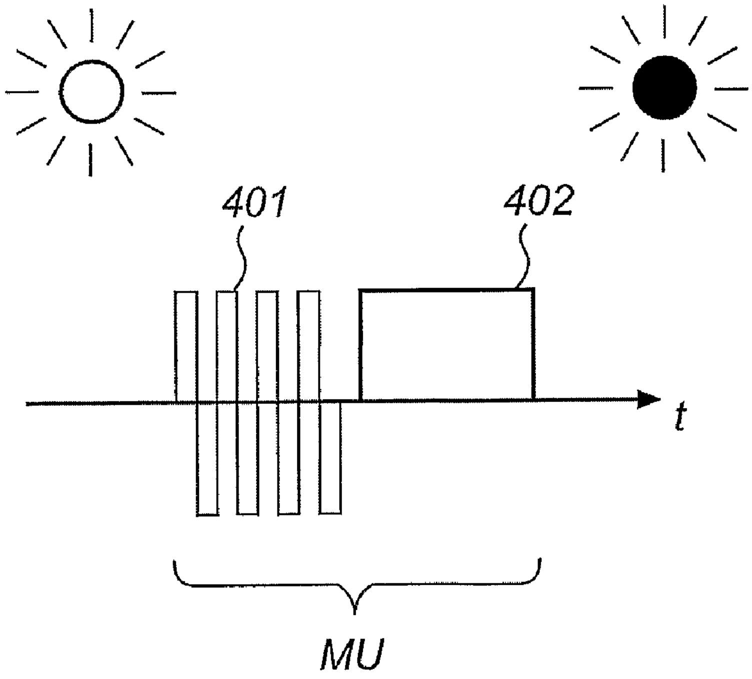
FIG. 4 illustrates typical drive signal waveforms for a monochrome drive scheme.

FIG. 3 illustrates a typical drive signal in a grayscale updating mode (GU). The drive signal comprises an initital shake signal 301, an over reset signal 302 putting the pixel an extreme state (e.g. black), an additional shake signal 303, and finally a drive signal 304 putting the pixel in a desired dark gray state 304. For comparison, FIG. 4 illustrates a typical drive signal in a monochrome updating mode (MU). This drive signal consists of only one shake signal 401 and one drive signal 402, changing the pixel from a first extreme state (e.g. white) to the opposite extreme state (e.g. black). Obviously, the drive signal used in the monochrome updating mode is cosiderably shorter in time and has a lower complexity.

Figure 5:
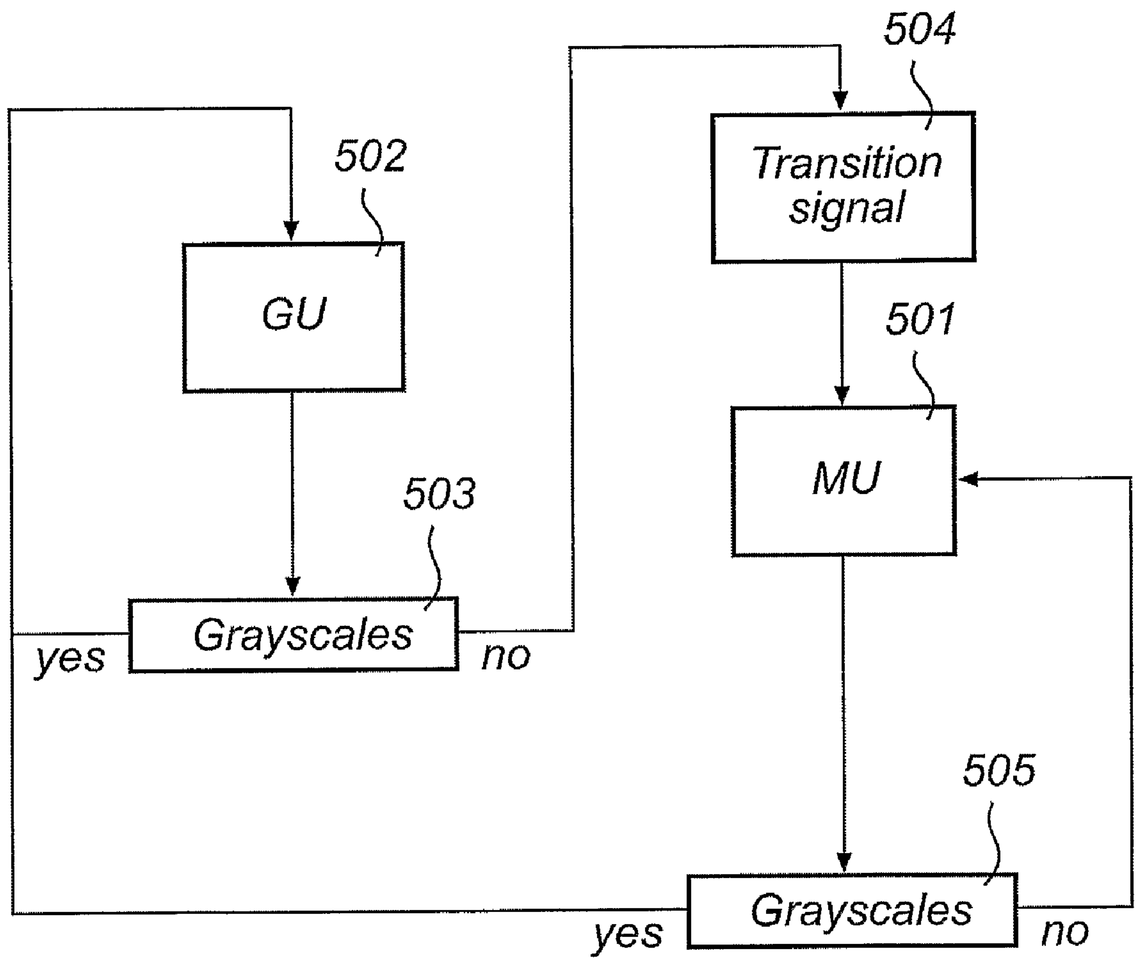
FIG. 5 illustrates a drive scheme implementing the present invention.

An example algorithm for the present invention, that can be employed in the drive unit 110 of the electrophoretic display 101, is schematically shown in FIG. 5. A monochrome updating scheme (MU) 501 is loaded when only monochrome data are updated, which occurs often in a black and white book or in a sub-window. The benefit is thus that the total image update time of the monochrome scheme 501 is usually about half of that used in a grayscale updating scheme. However, in case grayscales are to be included in the image, the grayscale updating mode 502 is used instead. Thus, when the image has been updated and the subsequent image information is received, the subsequent image information is checked for the existance of any grayscales 505. In case grayscales exists, the grayscale updating mode 502 is initiated. This drive mode is used as long as there are grayscales occuring in the desired images.

However, the faster monochrome updating mode 501 can be initialized again as soon as there are no need for grayscales. In such case a transition drive signal 504 is first applied, in accordance with the present invention, before picking drive signals from the monochrome updating mode 501.

Figure 6:
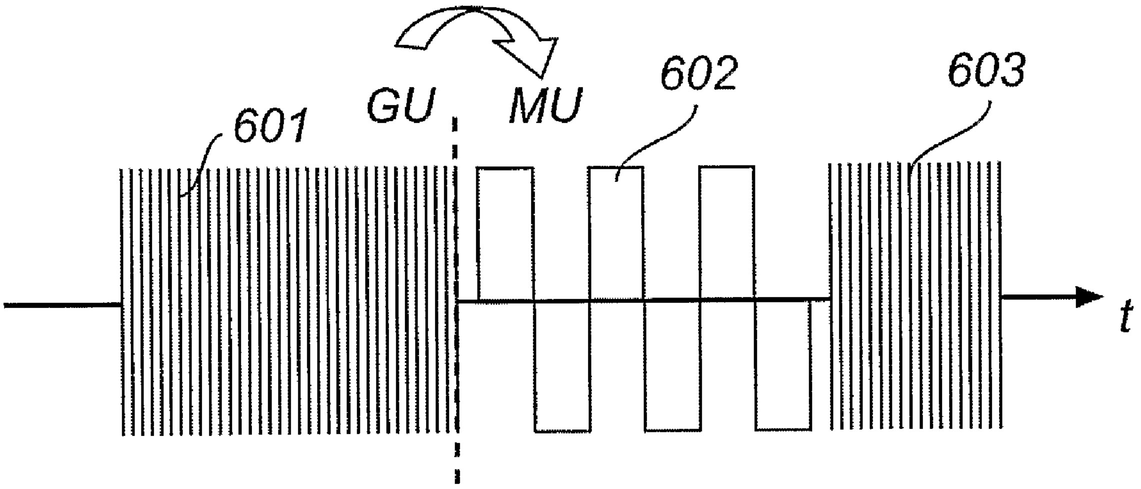
FIG. 6 illustrates a drive sequence employing a transition signal when switching from the grayscale updating mode to the monochrome updating mode.

FIG. 6 illustrates a drive signal sequence applied when switching from a grayscale updating mode to a monochrome updating mode. Thus, a GU-based drive signal 601 is first employed, followed by the transition drive signal 602 that is initiated once the transition to the monochrome updating mode is desired. The transition drive signal 602 can have many different designs, and serves to reduce any remanant DC voltages in the pixel. The particular transition drive signal 602 that is illustrated in FIG. 6 is constituted by consecutive driving of the pixel between the two extreme states before applying the monochrome drive signal 603 that finally puts the pixel in its desired state (one of the extreme states).

In the following, a number of envisaged embodiments for the transition drive signal will be described.

Embodiment 1: GU to MU Transition via an Initialise Mode

A first method to enable the GU to MU transition is to ensure that the display is initialised before the MU image is written. Initialisation essentially removes all prior history in the display, for example by repeatedly switching the entire display between the two extreme states. This embodiment is actually described above with reference to FIG. 6 and transition drive signal 602.

Whilst this approach will remove the problems of image retention, it will not solve the remnant DC problem described above. In order to reduce this problem, it is preferred to begin the initialisation sequence in such a way that the DC component is similar in both MU and GU mode. Such methods will be described in the following embodiments.

Embodiment 2: Transition with First MU Image Written with GU Waveform

A second method to enable the GU to MU transition is to write the first monochrome image of the MU series using the GU waveform. This has the advantage that all gray pixels are made either black or white according to the well defined GU waveforms, and therefore no additional artefacts will be introduced. Of course, the image update time will be longer than in MU mode (but shorter than in GU as there will be no transitions from e.g. white to dark grey or black to light grey—these are generally the longest waveforms).

Once all pixels are in the black or white state, image update can proceed according to the shorter MU waveforms.

This embodiment is thus recognized in that swithing from the grayscale updating mode to the monochrome updating mode is always accompanied by the use of the grayscale drive signal that puts the pixel into either of its extreme states.

This approach will remove the problems of image retention and will reduce the DC balancing problem described above, as now at least the first image update is carried out in the GU mode.

Embodiment 3: Transition with Addition of a DC Voltage Pulse to the First MU Waveform A third method to enable the GU to MU transition is to incorporate additional voltage pulses to the MU waveforms of the first monochrome image of the MU series in order to remove the DC voltage induced in the final image of the GU sequence.

Figure 7:
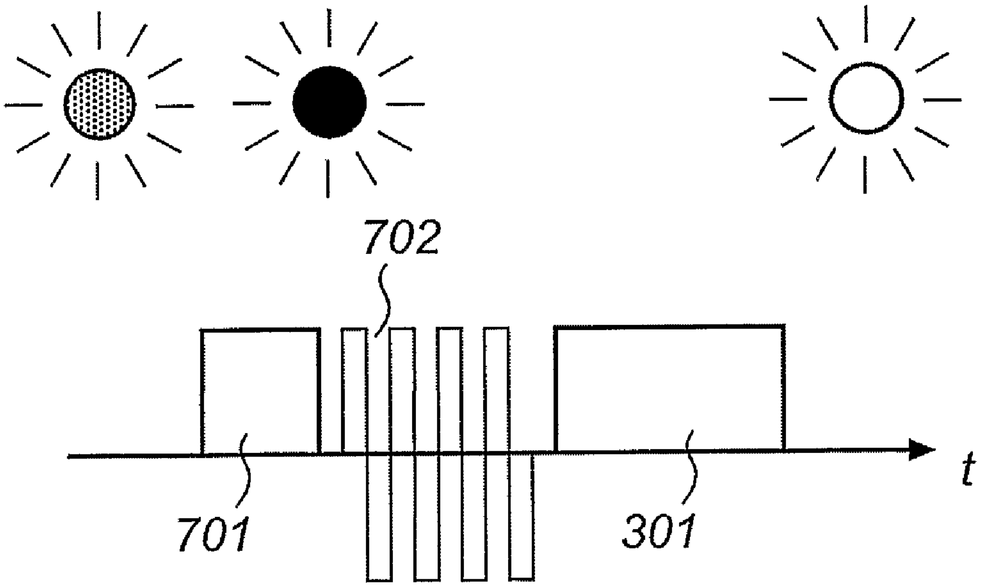
FIG. 7 illustrates a drive waveform including an transition signal in the form of a single remnant DC reducing voltage pulse.

This can be achieved for example for the waveform shown in FIG. 7, where a transition from a dark grey pixel (from the last GU waveform) to a white pixel (in the first MU waveform) is rendered. In this embodiment, for a 4 grey level display, 16 additional waveforms could be stored in a separate look-up-table (for example called MU') to facilitate this transition.

Now, the voltage used to write in the dark grey pixel in the GU image is removed by the short voltage pulse prior to the normal MU waveform. This approach will remove the problems of image retention and will reduce the DC balancing problem described above using a drive waveform which is shorter than in embodiment 2.

In still a further embodiment, the additional voltage pulse could be applied as a separate, short drive waveform, situated prior to the application of the standard MU waveform. Whilst the operation will be identical to that described above (and in FIG. 7), it will now no longer be necessary to store the additional 16 waveforms: only a small number of short pulses need to be stored (a maximum of 8, as only 8 possible transitions start from either light or dark grey states). This saves on memory for storing the waveforms.

It should be realised that the above description only serves to exemplify the present invention. It is readily appreciated that a vast number of alternative configurations are possible, based on the same principles and giving similar advantages. For example, the invention can be implemented in passive matrix as well as active matrix electrophoretic displays. Furthermore, the drive waveforms (i.e. the drive signals) can be pulse width modulated, voltage modulated, or pulse and width and voltage modulated. Also, the invention is applicable to color bi-stable displays and to single as well as multiple window displays, where, for example, a typewriter mode exists. The electrode structure is not limited to any particular design. Rather, the present invention is applicable to displays having any electrode configuration presently avaiable, or developed in the future, where different grayscale drive schemes and monochrome drive schemes are employed. Examples of electrode structures includes top/bottom electrode structures, a honeycomb structures, electrode structures for in-plane-switching and electrode structures for vertical switching of the electrophoretic media.

In essence, the present invention relates to electrophoretic displays that are switchable between a grayscale updating mode 502 and a monochrome updating mode 501. The monochrome updating mode 501 provides for extreme pixel states only (e.g. black and white), whereas the grayscale updating mode 501 provides for intermediate grayscale pixels states as well. According to the present invention, a suitably selected transition signal 504 is applied when switching from the grayscale updating mode 502 to the monochrome updating mode 501. The transition signal 504 involves a drive pulse that serves to reduce the level of remnant DC voltage otherwise occurring in each pixel due to differences in the grayscale updating mode 502 and the monochrome updating mode 501.

The invention claimed is:

1. An electrophoretic display comprising:

at least one pixel cell having drive electrodes and an electrophoretic media that is responsive to an electric field applied between said drive electrodes; and a drive unit arranged to provide said at least one pixel cell with a drive signal switchable between a monochrome drive scheme and a grayscale drive scheme, said monochrome drive scheme involving drive signals providing for only two extreme optical pixel states, and said grayscale drive scheme involving drive signals providing for said two extreme optical pixel states and at least one additional, intermediate pixel state between said two extreme optical pixel states, wherein said grayscale drive scheme provides drive signals for said two extreme optical states that are different than said monochrome drive scheme for said two extreme optical states, and wherein said drive unit furthermore is operative to apply a transition drive signal when switching from said grayscale drive scheme to said monochrome drive scheme, said transition drive signal being separate from signals applied during either of said monochrome drive scheme and said grayscale drive scheme and being arranged to counteract the build-up of remnant DC voltage in the pixel cell.

2. The electrophoretic display according to claim 1, comprising a number of pixel cells that are addressable in image frames, wherein said grayscale drive scheme is employed for image frames that include at least one intermediate pixel state and the monochrome drive scheme is employed for image frames that include extreme states only.

3. The electrophoretic display according to claim 1, further comprising a memory unit wherein pre-defined drive signals corresponding to the respective drive schemes are stored accessible by the drive unit.

4. The electrophoretic display according to claim 1, wherein said transition drive signal drives the pixel cell repeatedly to each of said two extreme optical pixel states so as to remove any remnant DC voltage in the pixel cell before the monochrome drive scheme is initiated.

5. The electrophoretic display according to claim 1, wherein said transition drive signal is a drive signal in the grayscale drive scheme that corresponds to a one of the two extreme optical pixel states of the monochrome drive scheme that would have immediately followed said transition drive signal and that replaces the one of the two extreme optical pixel states of the monochrome drive scheme that would have immediately followed said transition drive signal.

6. The electrophoretic display according to claim 1, wherein the transition drive signal is selected from a transition drive scheme that comprises more than one alternative transition drive signals.

7. The electrophoretic display according to claim 1, wherein the transition drive signal is applied when switching to said monochrome drive scheme only when switching from a subset of the pixel states provided for by said grayscale drive scheme that is less than all of the pixel states of said grayscale drive scheme, otherwise the transition drive signal is not applied.

8. The electrophoretic display according to claim 7, wherein said subset of pixel states excludes said extreme pixel states.

9. The electrophoretic display according to claim 1, wherein said transition drive signal is a drive signal that corresponds to a signal in the monochrome drive scheme that would have immediately followed said transition drive signal but modified with an additional remnant DC voltage reducing voltage pulse and that replaces the signal in the monochrome drive scheme that would have immediately followed said transition drive signal.

10. The electrophoretic display according to claim 9, wherein said additional remnant DC voltage reducing voltage pulse is employed before said monochrome drive scheme drive signal.

11. A method for driving an electrophoretic display, said method comprising the steps of:

receiving image information regarding an image to be displayed;

selecting a drive scheme from a monochrome updating drive scheme and a grayscale updating drive scheme, depending on the existence of grayscales in the image to be displayed, wherein said monochrome drive scheme includes drive signals providing for only two extreme optical pixel states, and said grayscale drive scheme includes drive signals providing for said two extreme optical pixel states and at least one additional, intermediate pixel state between said two extreme optical pixel states, wherein said grayscale drive scheme provides drive signals for said two extreme optical states that are different than said monochrome drive scheme for said two extreme optical states;

employing a transition signal in case the drive scheme is changed from the grayscale drive scheme to the monochrome drive scheme, said transition signal being separate from signals applied during either of said monochrome drive scheme and said grayscale drive scheme and being such that any remnant DC voltage is reduced;

employing a drive signal that is based on the selected drive scheme and that corresponds to said image to be displayed.

* * * * *